United States Patent [19]
Snider

[11] Patent Number: 6,102,296
[45] Date of Patent: Aug. 15, 2000

[54] INTEGRATED SWITCH PAD-ASPIRATED SENSOR SHROUD FOR VEHICULAR CLIMATE CONTROL SYSTEMS AND METHODS OF MANUFACTURE AND USE

[75] Inventor: Chris Ralph Snider, El Paso, Tex.

[73] Assignee: Delco Electronics Corp., Kokomo, Ind.

[21] Appl. No.: 09/293,893

[22] Filed: Apr. 19, 1999

[51] Int. Cl.[7] ...................................................... F24F 7/00
[52] U.S. Cl. ................................ 236/49.3; 236/DIG. 19; 361/695
[58] Field of Search .................................. 236/49.3, 49.1, 236/DIG. 19, 94; 361/695, 694, 691, 715, 719, 688, 690

[56] References Cited

U.S. PATENT DOCUMENTS

| | | | |
|---|---|---|---|
| 4,824,013 | 4/1989 | Gouldey | 236/78 R |
| 5,008,775 | 4/1991 | Schindler et al. | 361/383 |
| 5,364,025 | 11/1994 | Terry | 236/49.1 |
| 5,731,953 | 3/1998 | Sakurai | 361/695 |

*Primary Examiner*—William Doerrler
*Assistant Examiner*—Marc Norman
*Attorney, Agent, or Firm*—Jimmy L. Funke

[57] ABSTRACT

In a preferred embodiment, an integrated switch pad-aspirated sensor shroud for a vehicle climate control system, including: a switch pad including a base member; an opening defined through the base member through which opening ambient air may be drawn to flow across a temperature sensing element; a hinge member formed of one piece with the base member and extending therefrom; a sensor shroud formed of one piece with the hinge member, the sensor shroud being configured to provide a flow path for the ambient air; and the sensor shroud being attachable to a first element of the vehicle climate control system.

18 Claims, 8 Drawing Sheets

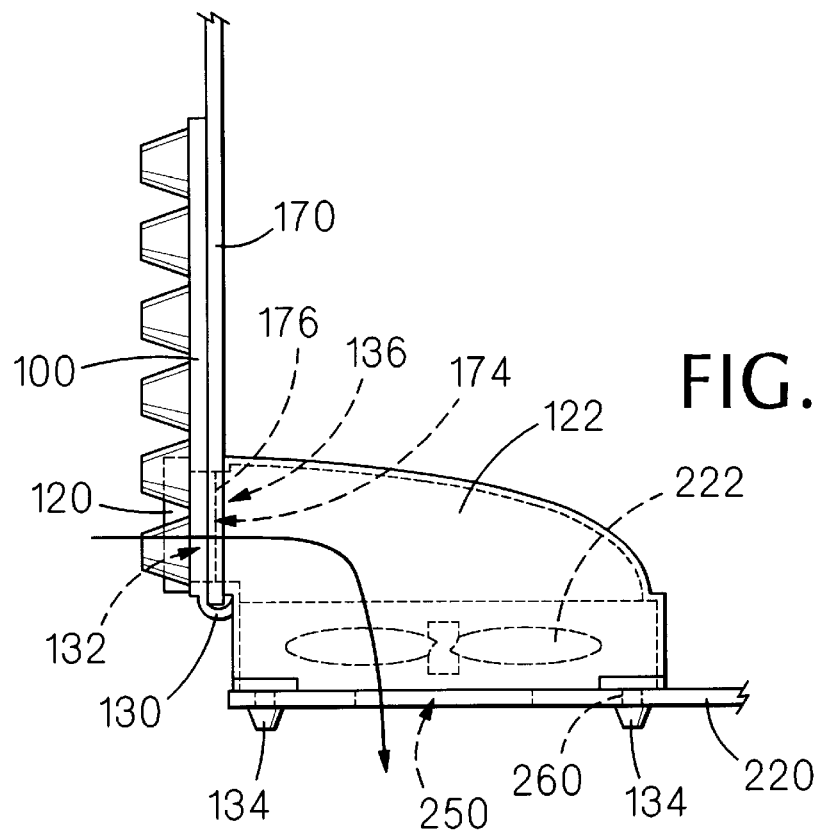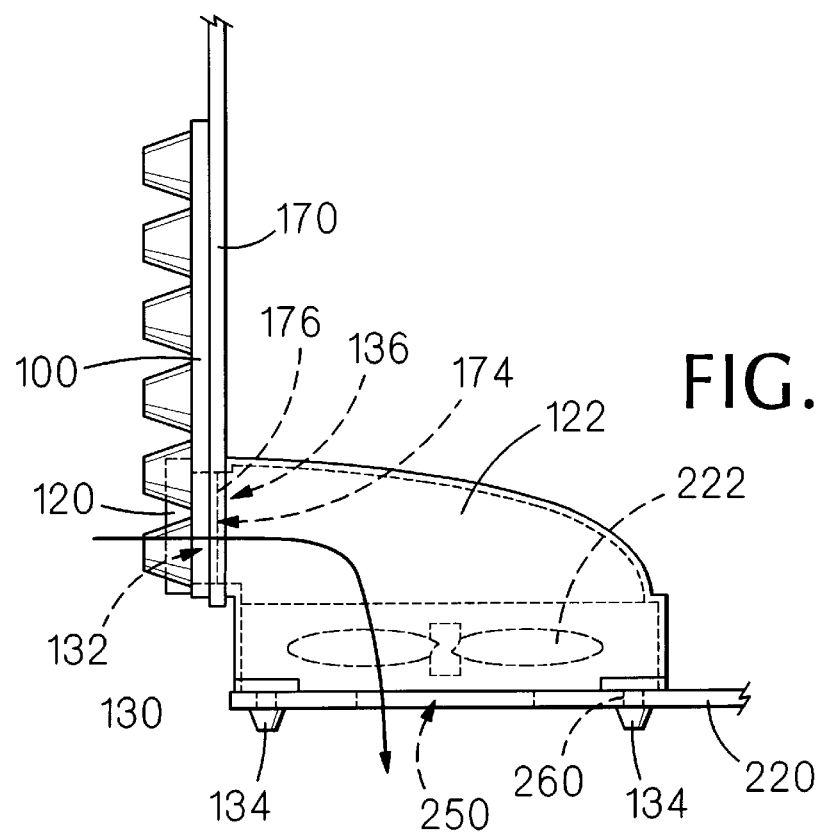

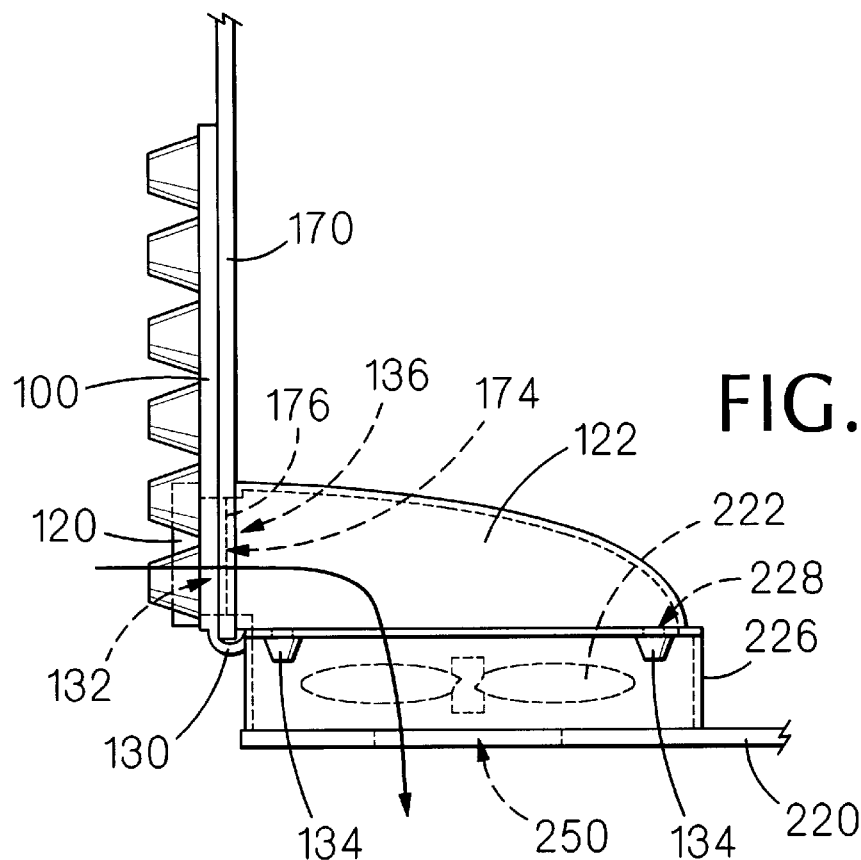
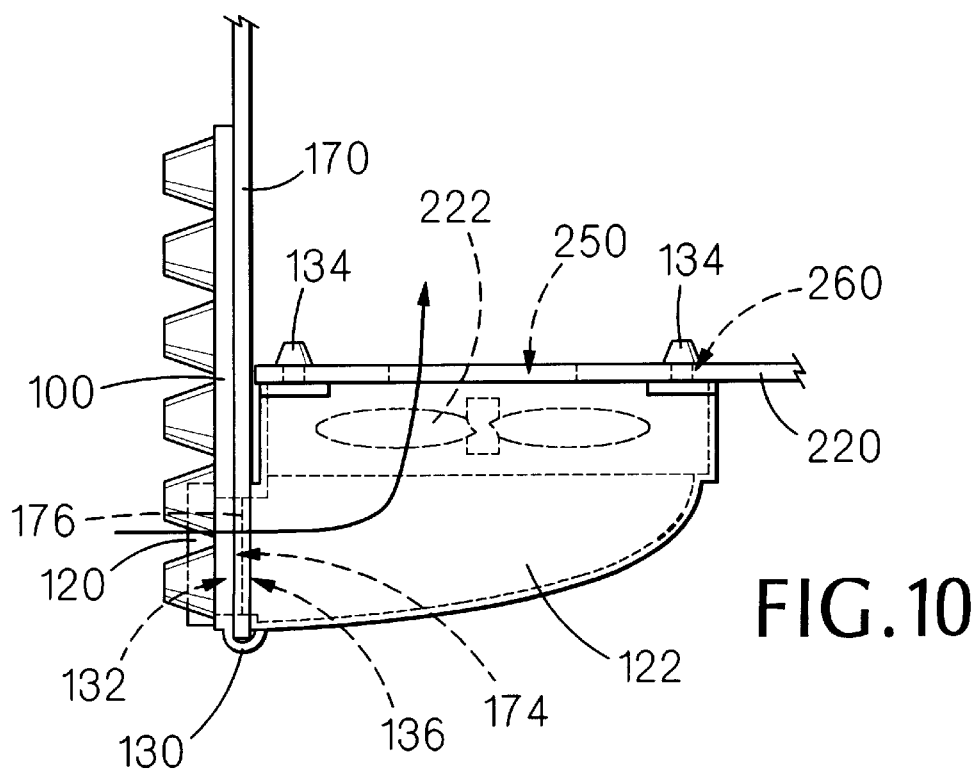

6,102,296

INTEGRATED SWITCH PAD-ASPIRATED SENSOR SHROUD FOR VEHICULAR CLIMATE CONTROL SYSTEMS AND METHODS OF MANUFACTURE AND USE

BACKGROUND OF THE INVENTION

1. Field of the Invention

The present invention relates to vehicular climate control systems generally and, more particularly, but not by way of limitation, to a novel integrated switch pad-aspirated sensor shroud for vehicular climate control systems and method of manufacturing.

2. Background Art

Automatic climate control systems are provided in most vehicles to adjust the interior temperature by controlling heating and cooling systems. Both the heating and cooling features have the usually beneficial effect of removing moisture from the interior environment to reduce humidity and prevent fogging of interior window surfaces. Such control systems often utilize an aspirated sensor to determine the vehicle interior temperature. This enables the climate control system to adjust itself based on the desired temperature set on the control head. Such vehicular climate control systems typically employ a thermistor as a sensing element and motorized means for drawing vehicle interior (or cabin) air across the thermistor to sense the temperature of the air in the cabin of the vehicle to allow an accurate temperature reading. In many cases, motorized means/aspirated sensor combination is used for this purpose and is incorporated directly into the control head which is mounted in the dashboard oft the vehicle.

In the past, positioning of the thermistor has been accomplished by soldering the thermistor or thermistor assembly to the switch or keyboard assembly, with the fan motor electrically and mechanically connected to the main circuit board assembly of the control assembly. With this method, ducting is provided so that air drawn by the fan will flow over the thermistor. Usually, this includes ducting to funnel the air from a larger orifice to a small cross-sectional area at the thermistor location on the switch circuit board. The typical method of providing such ducting is to use separate molded plastic parts that are assembled to the control or to use complex molding methods to integrate the ducted passage into other plastic pieces of the control. Some conventional control elements require side-core or collapsible-core tools to form the air directing channels. Also required is a shroud between the switch circuit board and the control assembly trimplate, which shroud is fabricated by similar methods. The primary disadvantage of the conventional methods is relatively high piece price, due to additional, separate tooling and added assembly time.

Accordingly, it is a principal object of the present invention to provide ducting for a temperature control element in a climate control system, which ducting does not require the use of individual, separate parts.

It is a further object of the invention to provide such ducting that is integral with the switch pad employed in climate control systems.

It is an additional object of the invention to provide such integral ducting that is economical to manufacture using modified conventional tooling that is otherwise used to produce the switch pad.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an integrated switch pad-aspirated sensor shroud for a vehicle climate control system, comprising: a switch pad including a base member; an opening defined through said base member through which opening ambient air may be drawn to flow across a temperature sensing element; a hinge member formed of one piece with said base member and extending therefrom; a sensor shroud formed of one piece with said hinge member, said sensor shroud being configured to provide a flow path for said ambient air; and said sensor shroud being attachable to a first element of said vehicle climate control system.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which:

FIG. 7 is a fragmentary, a side elevational view of one use of the embodiment of FIG. 5.

FIG. 8 is a fragmentary, side elevational view of another use of the embodiment of FIG. 5.

FIG. 9 is a fragmentary, side elevational view of a further use of the embodiment of FIG. 5.

FIG. 10 is a fragmentary, side elevational view of another embodiment of the present invention in use.

DETAILED DESCRIPTION OF THE PREFERRED EMBODIMENTS

Figure 1:
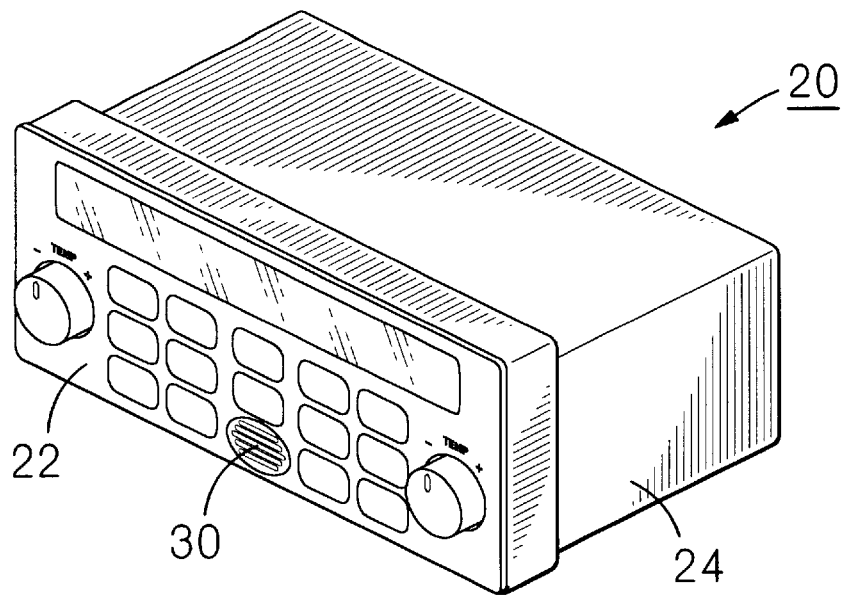
FIG. 1 is an isometric view of a conventional environmental control assembly.

Reference should now be made to the drawing figures on which similar or identical elements are given consistent identifying numerals throughout the various figures thereof, and on which parenthetical references to figure numbers direct the reader to the view(s) on which the element(s) being described is (are) best seen, although the element(s) may be seen on other figures also.

FIG. 1 illustrates a conventional environmental control assembly, generally indicated by the reference numeral 20. Environmental control assembly 20 includes a vertical faceplate 22 covering the vertical open end of a case 24. Other elements of environmental control assembly 20 are conventional and will be described below with reference to the present invention. Environmental control assembly 20 may be assumed to be, for illustrative purposes, to be an environmental control assembly mounted in the dashboard of a vehicle (neither shown). Of particular interest here is a vertical slotted grill 30 attached to, or formed as part of, faceplate 22. Slotted grill 30 covers an opening (not shown on FIG. 1) defined through faceplate 22, the opening being provided to permit an electrically driven fan to direct ambient air over a thermistor, as is described more fully below.

Figure 2:
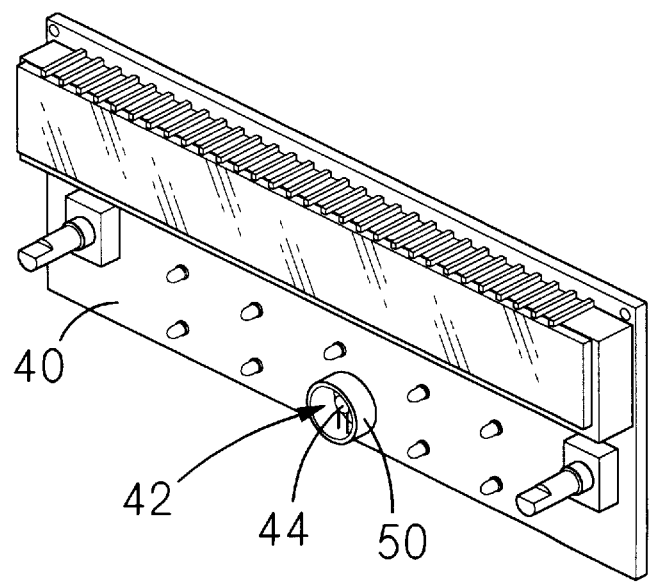
FIG. 2 is an isometric view of the keyboard assembly of the environmental control assembly of FIG. 1.

FIG. 2 illustrates a vertical keyboard assembly 40 of control assembly 20, which keyboard assembly is disposed in case 24 (FIG. 1) behind faceplate 22. Keyboard assembly 40 includes defined therethrough an opening 42 aligned with the opening in faceplate 22 covered by slotted grill 30 (FIG. 1). Disposed in opening 42 and mounted on keyboard assembly 40 is a thermistor 44 so arranged as to comprise the temperature sensing element for the air drawn through slotted grill 30 by an electrically driven fan and through opening 42. Conventional circuitry (not shown) is used to receive the output from thermistor 44 and to control the heating and cooling elements of the system which condition the air in the vehicle. Surrounding opening 42 and directing air across thermistor 44 is a horizontal cylindrical shroud 50 attached to keyboard assembly 40. As noted above, cylindrical shroud 50 is typically a separate molded plastic part that is separately formed from the other elements illustrates and which must be attached to keyboard assembly 40 by one of a number of conventional means (not indicated).

Figure 3:
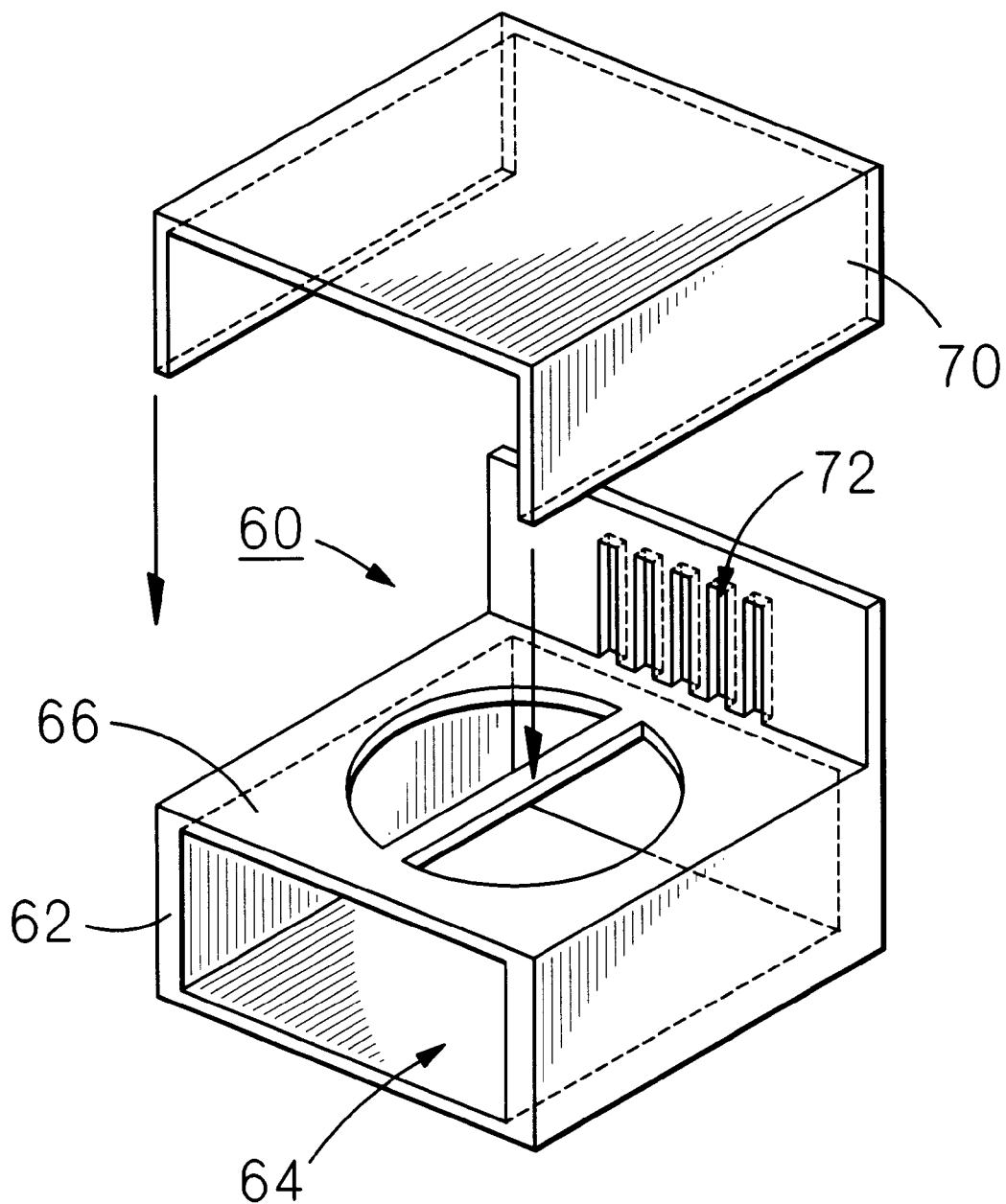
FIG. 3 is an isometric view of the air passage shroud of the control assembly of FIG. 1.

FIG. 3 illustrates a rectilinear shroud, generally indicated by the reference numeral 60, having a vertical front face 62 for attachment of the shroud to the rear surface of keyboard assembly 40 (FIG. 2) and having an air passage 64 aligned with opening 42. Rectilinear shroud 60 includes a horizontal fan receiving surface 66 for the attachment thereto of a fan and also includes a housing member 70 which covers the fan. A vertical rear wall of rectilinear shroud 60 includes defined therethrough a plurality of slots, as at 72, for the exhausting of air from the fan. It will be understood that the fan (not shown) will draw air through opening 42, over thermistor 44, into rectilinear shroud 60, past the fan, and exiting the rectilinear shroud through slots 70 in the rear of the rectilinear shroud. As was the case with cylindrical shroud (FIG. 2), the elements of rectilinear shroud must be separately manufactured and assembled and attached to the rear surface of keyboard assembly 40 by one or more suitable conventional means, all of these steps adding cost to the final environmental control system.

Figure 4:
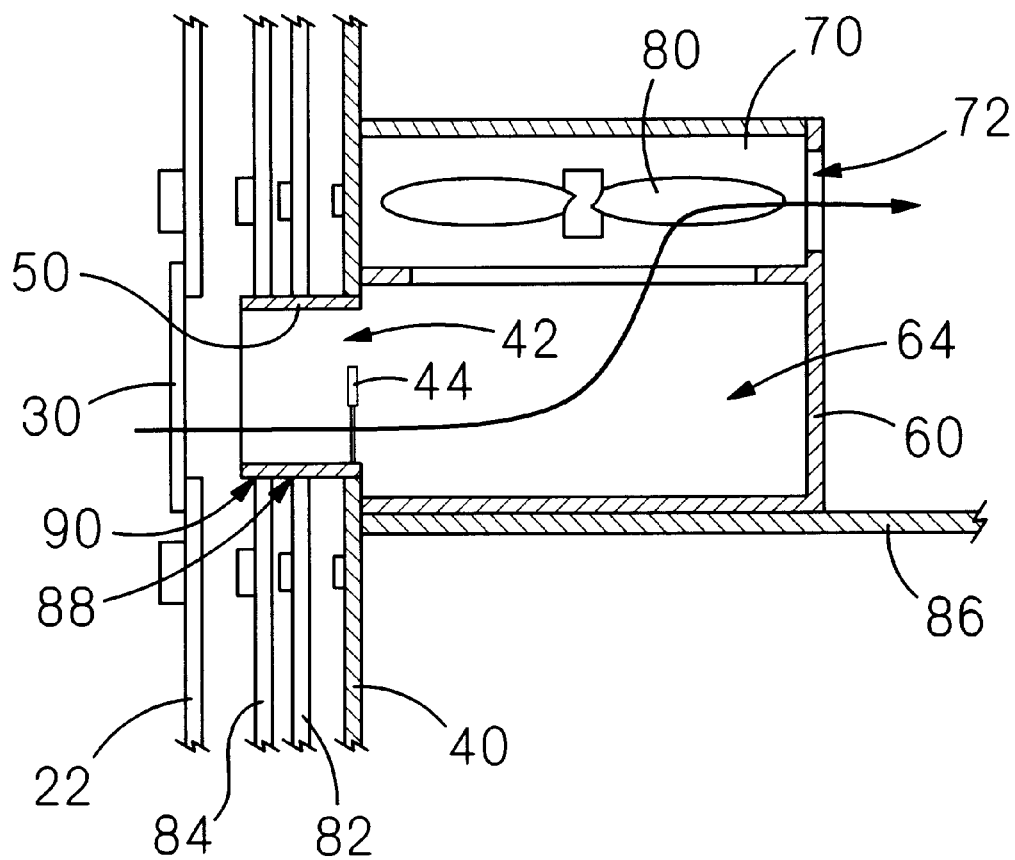
FIG. 4 is a fragmentary, side-elevational view of a portion of the control assembly of FIG. 1.

FIG. 4 illustrates the elements of FIGS. 1–3 with the addition of the conventional elements of a fan 80 disposed on rectilinear shroud 60 within housing 70, a vertical switch pad 82 disposed in front of keyboard assembly 40, a vertical pushbutton assembly 84 disposed between faceplate 22 and the switch pad, and a horizontal main circuit board assembly 86 on which is disposed the rectilinear shroud. Switch pad 82 and pushbutton assembly 84 have defined therethrough, respectively, openings 88 and 90 to accommodate therein cylindrical shroud 50. The path of air through the elements is clearly indicated by the arrow on FIG. 4 which shows the air being drawn by fan 80 through slotted grill 30, through cylindrical shroud 50 and over thermistor 44, through air passage 64, and through the fan, and, then, expelled by the fan out of rectilinear shroud 60 through slots 72. As was noted above, the various air directing elements, such as cylindrical shroud 50, rectilinear shroud 60, and fan housing 70 must be separately manufactured, assembled, and attached to keyboard assembly 40 and to circuit board assembly by one or more suitable conventional means.

Figure 5:
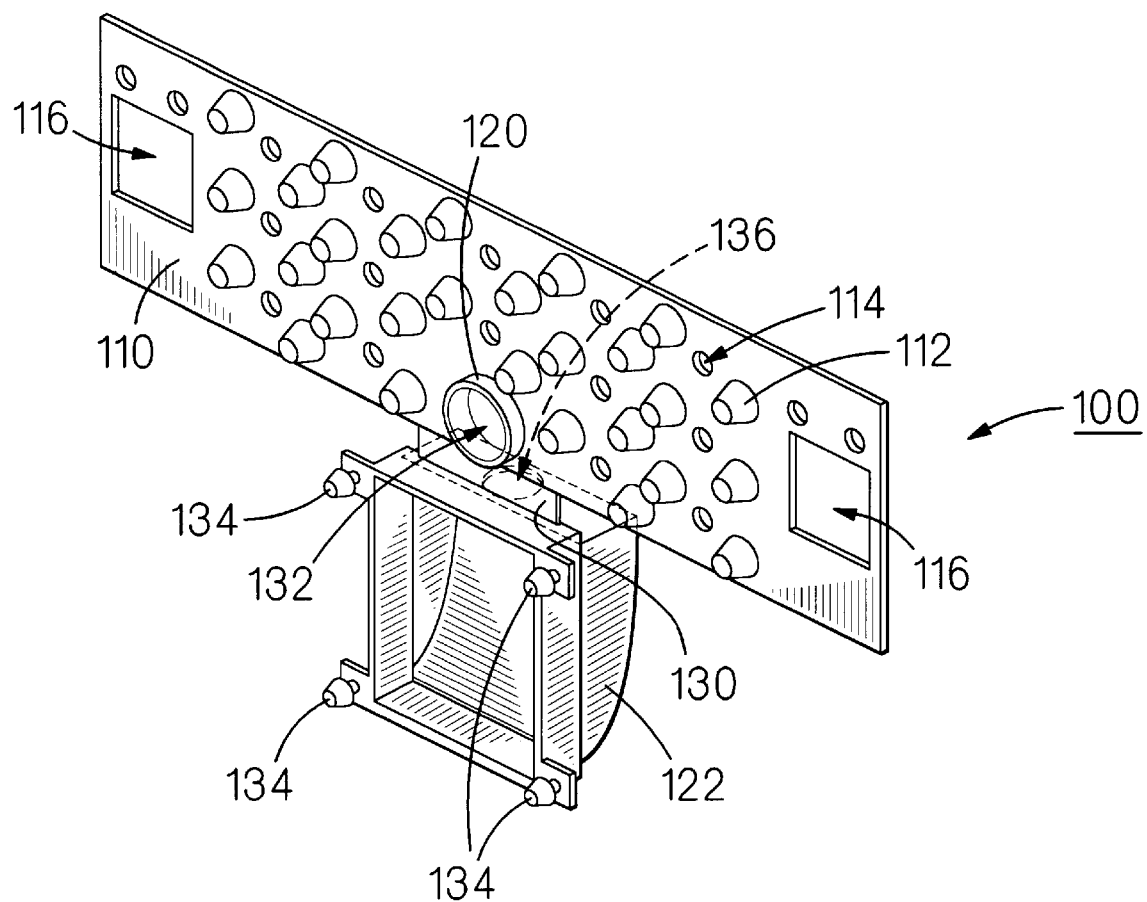
FIG. 5 is an isometric view of one embodiment of the present invention.

FIG. 5 illustrates a vertical switch pad, constructed according to one embodiment of the present invention, and generally indicated by the reference numeral 100. Switch pad 100 includes a vertical base member 110 having extending forwardly thereof a plurality of collapsible switch domes, as at 112, a plurality of indicator light openings, as at 114, and two openings 116 to accommodate the shafts of rotary control elements (no rotary control elements shown of FIG. 5). The elements of switch pad 100 described so far are conventional and the switch pad is typically a rubber membrane component, with a carbon pill (not shown) disposed underneath a collapsible switch dome 112, such that when a switch over the collapsible dome is pressed, that action collapses the dome and momentarily closes a circuit. Each rubber switch dome 112 is resilient and is designed so that it has a measured force curve.

Continuing to refer to FIG. 5, in addition to the conventional components of switch pad 100 described above, the switch pad includes, integrally molded therewith, a cylindrical shroud 120 and a sensor shroud 122, the latter two elements having the same functions as cylindrical shroud 50 and rectilinear shroud 60 (FIG. 4) of a conventional control assembly arrangement. Cylindrical shroud 120 is directly integrally molded with base member 110 and surrounds an opening 132 defined through the base member, while sensor shroud 122 is attached to the base member by means of an integrally molded hinge segment 130. Four pull-through tabs 134 are provided at the forward corners of sensor shroud 122, the function of which pull-through tabs will be described below. Sensor shroud 122 includes an opening 136 defined through the upper horizontal surface thereof.

Figure 6:
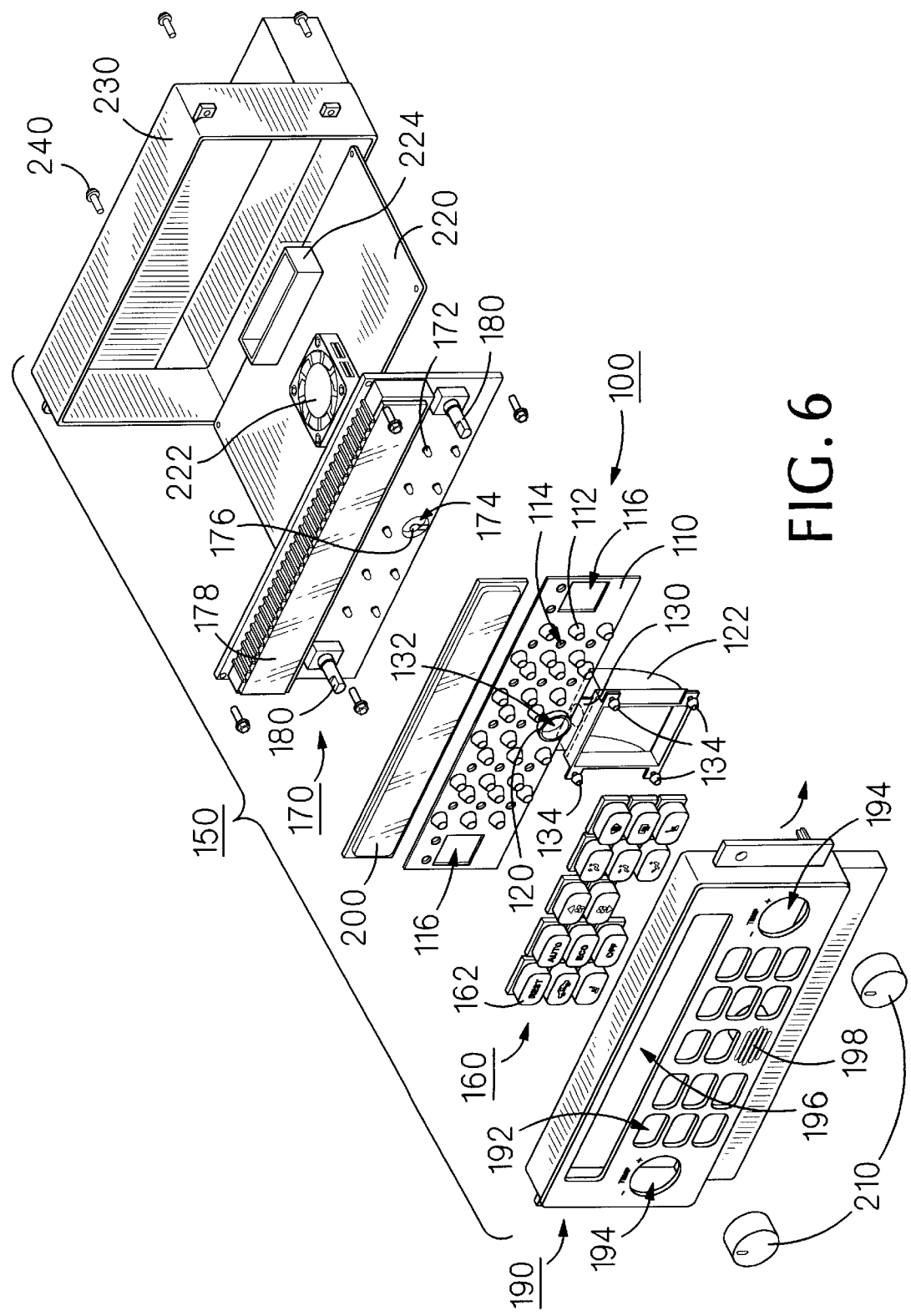
FIG. 6 is an exploded isometric view of the embodiment of FIG. 5 together with other elements of a control assembly.

FIG. 6 illustrates an environmental control assembly, generally indicated by the reference numeral 150, including switch pad 100, and describing more fully details of the elements of the control assembly.

Immediately adjacent the front surface of switch pad 100 is a pushbutton assembly, generally indicated by the reference numeral 160, and including a plurality of pushbuttons, as at 162, each aligned with one or two switch domes 112 on the switch pad. In some cases, a pushbutton 162 is aligned with one switch dome 112 and, in other cases, a pushbutton is aligned with two switch domes in order to provide balancing of forces as the pushbutton is manually depressed.

Immediately adjacent the rear surface of switch pad 100 is a vertical keyboard assembly, generally indicated by the reference numeral 170, and including a plurality of switch elements, as at 172, each switch element being aligned with a pushbutton 162 on pushbutton assembly 160 such that manual depression of the pushbutton and the collapsing of one or two intermediate switch domes 112 on switch pad 100 will cause the momentary closing of an electrical circuit (not shown). Defined through keyboard assembly 170 is an opening 174, aligned with cylindrical shroud 120 on switch pad 100, in which opening is mounted a thermistor 176, the function of which thermistor is identical to thermistor 44 described above with reference to FIG. 2. Keyboard assembly 170 also includes a display area 178 where information relating to the operation of environmental control assembly 150 can be displayed. Keyboard assembly 170 has extending horizontally from the front thereof two shafts 180 of rotary control elements.

Disposed in front of pushbutton assembly 160 is a vertical faceplate, generally indicated by the reference numeral 190, and having defined therethrough a plurality of openings, as at 192, for the extension therethrough of pushbuttons 112, two openings 194 for the extensions therethrough of shafts 180 on keyboard assembly 170, an opening 196 for the viewing therethrough of display area 178 on the keyboard assembly, and a slotted grill 198 covering an opening defined through the faceplate, the opening being aligned with cylindrical shroud 120 on switch pad 100. A clear lens 200 is aligned with opening 196 defined through vertical faceplate 190.

Two knobs 210 are provided for operative attachment to the distal ends of shafts 180 and lens 200 is disposed between opening 196 in faceplate 190 and display area 178 in keyboard assembly 170. A horizontal main circuit board assembly 220 extends rearwardly of keyboard assembly 170 and has mounted thereon a fan 222 and a connector 224 for wire connection to external elements (not shown). A case 230 is provided to contain switch pad 100 and assemblies 160 and 170, with faceplate 190 covering the open front end of the case. A plurality of fasteners, as at 240, is provided to secure together the various elements of environmental control assembly 150.

FIG. 7 illustrates one use of switch pad 100 with integrally molded sensor shroud 120. Here, fan 222 is mounted on horizontal main circuit board assembly 220 over a opening 250 defined through the main circuit board assembly. In this case, hinge segment 130 has been molded of a material sufficiently resilient that it has been stretched around the lower edge of keyboard assembly 170 such that sensor shroud 122 has been placed horizontally over main circuit board assembly 220, with opening 136 in the sensor shroud in alignment with opening 174 in keyboard assembly 170, and with the sensor shroud mounted to the main circuit board assembly 220 so as to form a housing for fan 222. Sensor shroud 122 is mounted to main circuit board assembly by means of pulling pull-through tabs 134 through openings 260 defined through the main circuit board assembly, with plastic deformation of the pull-through tabs as they are pulled through the openings. The resulting air flow path is shown by the arrow on FIG. 7, with the air being drawn by fan 222, having no separate housing, through cylindrical shroud 120, through opening 136, through opening 174 and across thermistor 176, through sensor shroud 122, and through the fan, with the air exiting sensor shroud 122 through opening 250.

FIG. 8 illustrates essentially the same arrangement of major elements as shown on FIG. 7 except, in this case, sensor shroud 122 has been severed from hinge segment 130 (FIG. 5) and mounted on horizontal main circuit board assembly 220. Again, sensor shroud 122 has been placed horizontally over main circuit board assembly 220, with opening 136 in the sensor shroud in alignment with opening 174 in keyboard assembly 170, and with the sensor shroud mounted to the main circuit board assembly 220 so as to form a housing for fan 222. Sensor shroud 122 is mounted to main circuit board assembly 220 by means of pulling pull-through tabs 134 through openings 260 defined through the main circuit board assembly, with plastic deformation of the pull-through tabs as they are pulled through the openings. The resulting air flow path is shown by the arrow on FIG. 8, with the air being drawn by fan 222, having no separate housing, through cylindrical shroud 120, through opening 136, through opening 174 and across thermistor 176, through sensor shroud 122, and through the fan, with the air exiting sensor shroud 122 through opening 250. No separate connection means needs to be provided between sensor shroud 122 and the rear surface of keyboard assembly 170, since the sensor shroud is secured in place by virtue of its mounting to main circuit board assembly 220, the keyboard assembly and the main circuit board being rigidly aligned by other means (FIG. 6).

FIG. 9 again illustrates essentially the same arrangement of major elements as shown on FIG. 7, with segment 130 having been stretched sufficiently that sensor shroud 122 is mounted on fan 222, the fan having its own housing, 226, with sensor shroud 122 being mounted to main circuit board assembly 220 by means of pulling pull-through tabs 134 through openings 228 defined through fan housing 226, with plastic deformation of the pull-through tabs as they are pulled through the openings. The resulting air flow path is shown by the arrow on FIG. 9, with the air being drawn by fan 222, through cylindrical shroud 120, through opening 136, through opening 174 and across thermistor 176, through sensor shroud 122, and through the fan and its housing 226, with the air exiting sensor shroud fan housing 226 through opening 250.

FIG. 10 illustrates an arrangement wherein fan 222, without its own housing, is mounted underneath horizontal main circuit board assembly 220. The location of hinge segment 130 on sensor shroud 122 has been relocated somewhat to permit the sensor shroud to be stretched to provide a housing for the fan and to provide for directing the air flow over thermistor 176. Again, sensor shroud 122 is mounted to main circuit board assembly 220 by means of pulling pull-through tabs 134 through openings 260 defined through main circuit board assembly 220, with plastic deformation of the pull-through tabs as they are pulled through the openings. The resulting air flow path is shown by the arrow on FIG. 10, with the air being drawn by fan 222, through cylindrical shroud 120, through opening 136, through opening 174 and across thermistor 176, through sensor shroud 122, and through the fan, with the air exiting sensor shroud fan housing 226 through opening 250.

Figure 11:
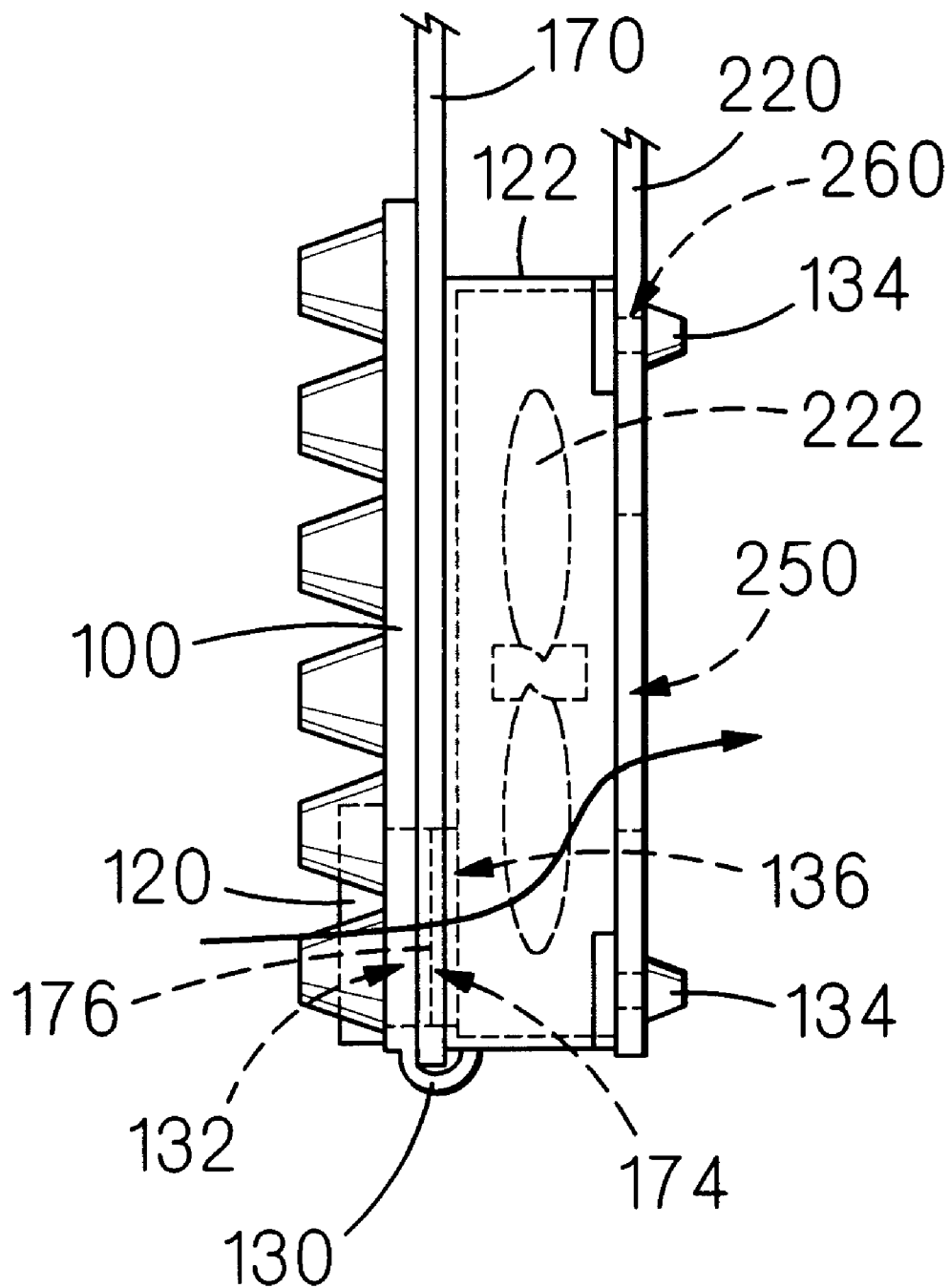
FIG. 11 is a fragmentary, side elevational view of a further embodiment of the present invention in use.

FIG. 11 illustrates an arrangement wherein sensor shroud 122 has been modified for the case in which fan 222 is mounted on vertical main circuit board assembly 220. Here, sensor shroud 122 is mounted to vertical main circuit board assembly 220 by means of pulling pull-through tabs 134 through openings 260 defined through main circuit board assembly 220, with plastic deformation of the pull-through tabs as they are pulled through the openings. The resulting air flow path is shown by the arrow on FIG. 11, with the air being drawn by fan 222, through cylindrical shroud 120, through opening 136, through opening 174 and across thermistor 176, through sensor shroud 122, and through the fan, with the air exiting sensor shroud fan housing 226 through opening 250.

Referring back to FIG. 5, by integrating the ducted passage, i.e., sensor shroud 122 with cylindrical shroud 120, for the aspirated sensor into switch pad 100, the complexities of tooling are reduced. Switch pad 100 is preferably formed from silicone rubber, which enables hinge segment 130 to be pliable enough to be stretched sufficiently to permit sensor shroud 122 to provide ducting to fan 222 (FIG. 7). Silicone rubber also permits molding switch pad 100 in varying durometer to provide "rigid" and "soft" areas for structural and sealing surfaces, thus permitting the details required to form more rigid portions of the molded part and, at the same time, providing the soft areas for sealing purposes.

Manufacture of switch pad 100 requires no tooling in addition to that otherwise required for a conventional switch pad. Simpler assembly tooling is made possible because switch pad 100 can be folded and captured during assembly, without the need to handle separate parts.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. An integrated switch pad-aspirated sensor shroud for a vehicle climate control system, comprising:
   (a) a switch pad including a base member;
   (b) an opening defined through said base member through which opening ambient air may be drawn to flow across a temperature sensing element;
   (c) a hinge member formed of one piece with said base member and extending therefrom;
   (d) a sensor shroud formed of one piece with said hinge member, said sensor shroud being configured to provide a flow path for said air; and
   (e) said sensor shroud being attachable to a first element of said vehicle climate control system.

2. An integrated switch pad-aspirated sensor shroud for a vehicle climate control system, as defined in claim 1, further comprising: an opening shroud formed of one piece with said base member of said switch pad and surrounding said opening defined through said base member.

3. An integrated switch pad-aspirated sensor shroud for a vehicle climate control system, as defined in claim 1, wherein: element (e) includes said hinge member being resiliently stretchable around an edge of a second element of said vehicle climate control system to permit said sensor shroud to be attached to said first element of said vehicle climate control system.

4. An integrated switch pad-aspirated sensor shroud for a vehicle climate control system, as defined in claim 1, wherein: when said sensor shroud is attached to said first element of said vehicle climate control system, said sensor shroud forms a housing for a fan to draw said air across said temperature sensing element.

5. An integrated switch pad-aspirated sensor shroud for a vehicle climate control system, as defined in claim 1, wherein said first element is a housing of a fan to draw said air across said temperature sensing element.

6. An integrated switch pad-aspirated sensor shroud for a vehicle climate control system, as defined in claim 1, wherein: element (e) includes said hinge member being severable to separate said sensor shroud from said switch pad.

7. A vehicle climate control system, comprising:
   (a) a housing;
   (b) a switch pad disposed in said housing, said switch pad having a base member and being disposed between a switch assembly and a keyboard assembly, both disposed in said housing, said keyboard assembly having a first opening defined therethrough;
   (c) a temperature sensing element disposed in said first opening, over which temperature sensing element ambient air may be drawn;
   (d) a second opening defined through said sensor shroud, said second opening being aligned with said first opening;
   (e) a hinge member formed of one piece with said base member and extending therefrom;
   (f) a sensor shroud formed of one piece with said hinge member;
   (g) said sensor shroud being attached in said vehicle climate control system so as to provide a flow path for said air.

8. A vehicle climate control system, as defined in claim 7, further comprising: an opening shroud formed of one piece with said switch pad and surrounding said second opening.

9. A vehicle climate control system, as defined in claim 7, wherein: said sensor shroud is attached to a circuit board assembly.

10. A vehicle climate control system, as defined in claim 9, wherein: said sensor shroud provides a housing for a fan mounted on said circuit board assembly.

11. A vehicle climate control system, as defined in claim 9, wherein: said sensor shroud is attached to said circuit board assembly by means including said hinge member having been stretched around an edge of said keyboard assembly.

12. A vehicle climate control system, as defined in claim 9, wherein: said sensor shroud has been attached to said circuit board assembly after said sensor shroud has been detached from said switch pad by severing said hinge member.

13. A method of assembling a climate control system for a vehicle, comprising:
   (a) providing a switch pad including a base member, with an opening defined through said base member through which opening ambient air may be drawn to flow across a temperature sensing element, a hinge member formed of one piece with said base member and extending therefrom, a sensor shroud formed of one piece with said hinge member, and said sensor shroud being configured to provide a flow path for said air; and
   (b) attaching said sensor shroud to a first element of said vehicle climate control system so that said sensor shroud forms a flow path for said air.

14. A method of assembling a climate control system for a vehicle, as defined in claim 13, wherein: step (b) includes resiliently stretching said hinge member around an edge of an assembly adjacent said switch pad so that said sensor shroud can be attached to said first element.

15. A method of assembling a climate control system for a vehicle, as defined in claim 13, wherein: step (b) includes detaching said sensor shroud from said base member so that said sensor shroud can be attached to said first element.

16. A method of assembling a climate control system for a vehicle, as defined in claim 13, further comprising: providing an opening shroud formed of one piece with said base member and surrounding said second opening.

17. A method of manufacturing an integral switch pad-aspirated sensor shroud for a vehicle climate control system, comprising:
   (a) molding said switch pad including a base member having an opening defined therethrough;
   (b) molding a hinge member of one piece with said base member; and
   (c) molding a sensor shroud of one piece with said hinge member, said sensor shroud being configured to serve as a pathway for air to be drawn over a temperature sensing element in said vehicle climate control system.

18. A method of manufacturing an integral switch pad-aspirated sensor shroud for a vehicle climate control system, as defined in claim 17, further comprising: molding an opening shroud of one piece with said base member, said opening shroud surrounding said opening in said base member.

* * * * *